United States Patent [19]
Walker

[11] 4,414,805
[45] Nov. 15, 1983

[54] HYBRID GAS TURBINE ENGINE AND FLYWHEEL PROPULSION SYSTEM

[75] Inventor: Frank H. Walker, Grand Blanc, Mich.

[73] Assignee: General Motors Corporation, Detroit, Mich.

[21] Appl. No.: 325,335

[22] Filed: Nov. 27, 1981

[51] Int. Cl.³ .............................................. F02C 3/10
[52] U.S. Cl. ................................ 60/39.161; 60/39.43; 60/39.5
[58] Field of Search ............... 60/39.04, 39.161, 39.27, 60/39.41, 39.5, 39.43, 39.163

[56] References Cited

U.S. PATENT DOCUMENTS

| | | |
|---|---|---|
| 2,986,882 | 6/1961 | Pavlecka . |
| 3,097,485 | 7/1963 | Bidwell . |
| 3,369,361 | 2/1968 | Craig ..................................... 60/39.5 |
| 3,778,695 | 12/1973 | Bauer, Jr. ......................... 417/45 X |
| 3,981,140 | 9/1976 | Lunsford et al. . |
| 4,157,011 | 6/1979 | Liddle ................................ 60/39.27 |
| 4,163,367 | 8/1979 | Yeh ................................... 60/668 X |
| 4,301,649 | 11/1981 | Walker ............................. 60/39.5 X |

OTHER PUBLICATIONS

Gasparovic, "Gas Turbine Cycle Operating Partly at Sub-Atm. Press.", *Nav. Eng. J.*, 12-1974, pp. 81-90.

*Primary Examiner*—Louis J. Casaregola
*Assistant Examiner*—Donald E. Stout
*Attorney, Agent, or Firm*—Saul Schwartz

[57] ABSTRACT

A hybrid propulsion system particularly for automotive application including a subambient pressure cycle gas turbine engine having a primary turbine-compressor rotor assembly connected to a load shaft and a secondary turbine-compressor rotor assembly gas coupled with the primary rotor assembly, a flywheel rotatable with the secondary rotor assembly, and variable geometry nozzles at the turbines operative during engine operation at a steady state power output level to effect partial motive fluid expansion at the primary turbine to drive the load and the primary compressor and partial motive fluid expansion at the secondary turbine to drive the secondary compressor which maintains subambient pressure and during engine operation at a peak power output level to effect substantially total motive fluid expansion across only the primary turbine for increased power at the load shaft, the flywheel being operative during peak power level operation to drive the secondary compressor to maintain total motive fluid expansion to subambient pressure.

5 Claims, 3 Drawing Figures

HYBRID GAS TURBINE ENGINE AND FLYWHEEL PROPULSION SYSTEM

BACKGROUND OF THE INVENTION

This invention relates generally to vehicle propulsion systems and, more particularly, to a hybrid gas turbine engine and flywheel propulsion systems for automotive vehicles.

Gas turbine engines are attractive for many vehicle propulsion applications because of their excellent fuel economy at full power, relatively low mass, low exhaust emission levels, and fuel versatility. However, gas turbine engines are less than ideally suited for automotive propulsion applications because, among other reasons, typical automotive duty cycles require engine operation for extended periods at low power levels where gas turbine engines encounter fuel economy penalties, rapid response to operator command comparable to internal combustion engines is required and not typically available, and low material and manufacturing costs are necessary for competitive reasons but difficult to achieve. Accordingly, numerous gas turbine engine configurations have been proposed which address various ones of the problems inherent in automotive applications. For example, in U.S. Pat. No. 3,981,140, issued Sept. 21, 1976 to Lunsford et al and assigned to the assignee of this invention, a single shaft gas turbine engine with improved compactness, lower mass, and lower associated costs than two-shaft engines is disclosed and includes variable geometry at the turbine nozzle, the compressor inlet, and the compressor diffuser for increased economy at low power levels. Also, in U.S. Pat. No. 3,097,485, issued July 16, 1963 to Joseph Bidwell and assigned to the assignee of this invention, a hybrid gas turbine engine and flywheel system is disclosed which overcomes the inherent lack of responsiveness in gas turbine engines through the use of a flywheel arrangement. In addition, commencing at page 81 of *Naval Engineers Journal,* issue of December, 1974, Dr. -Ing. N. Gasparovic describes performance improvements achieved in naval propulsion gas turbine engine applications where turbine motive fluid is expanded through one or more turbines from superatmospheric or superambient pressure to subatmospheric or subambient pressure and then compressed in a secondary compressor back to ambient pressure for exhaust to atmosphere. A hybrid gas turbine engine and flywheel propulsion system according to this invention represents a new and improved combination of a flywheel type energy storage unit and a subambient pressure cycle gas turbine engine which combination is particulary suited for automotive applications.

SUMMARY OF THE INVENTION

The primary feature, then, of this invention is that it provides a new and improved hybrid gas turbine engine and flywheel propulsion system particularly suited for automotive applications. Another feature of this invention resides in the provision in the new and improved hybrid propulsion system of a subambient pressure cycle gas turbine engine for improved fuel economy and compactness and a flywheel connected to a secondary rotor of the engine for supplying energy to the engine during transient peak power demand cycles such as vehicle acceleration. Still another feature of this invention resides in the provision in the new and improved hybrid propulsion system of a subambient pressure cycle gas turbine engine including a primary compressor-turbine rotor assembly having a load shaft connected thereto, the primary rotor assembly functioning effectively as a single shaft gas turbine engine to drive the load shaft, and a secondary turbine-compressor rotor assembly gas coupled in series with the primary rotor assembly such that exhaust from the primary rotor turbine expands through the secondary rotor turbine to a subambient pressure level maintained by the secondary rotor compressor, the latter normally being driven by the secondary rotor turbine and compressing turbine exhaust back to ambient pressure for exhaust to atmosphere. A still further feature of this invention resides in the provision in the new and improved hybrid propulsion system of a flywheel drivingly connected to the secondary rotor assembly and in the provision of adjustable nozzles at the primary rotor turbine and at the secondary rotor turbine which nozzles distribute motive fluid energy between the primary and secondary rotor turbines during periods of engine operation at steady state power levels such that the primary rotor turbine drives the load shaft, the secondary rotor turbine drives the secondary rotor compressor, and the secondary rotor compressor maintains total expansion through the two turbines to subambient pressure levels and which nozzles distribute substantially all of the motive fluid energy to the primary rotor turbine during peak power duty cycles so that substantially increased power is available at the load shaft, the flywheel being operative during peak power duty cycles to drive the secondary rotor compressor for maintaining total motive fluid expansion to subambient pressure levels. These and other features of this invention will be readily apparent from the following specification and from the drawings wherein:

Figure 1:
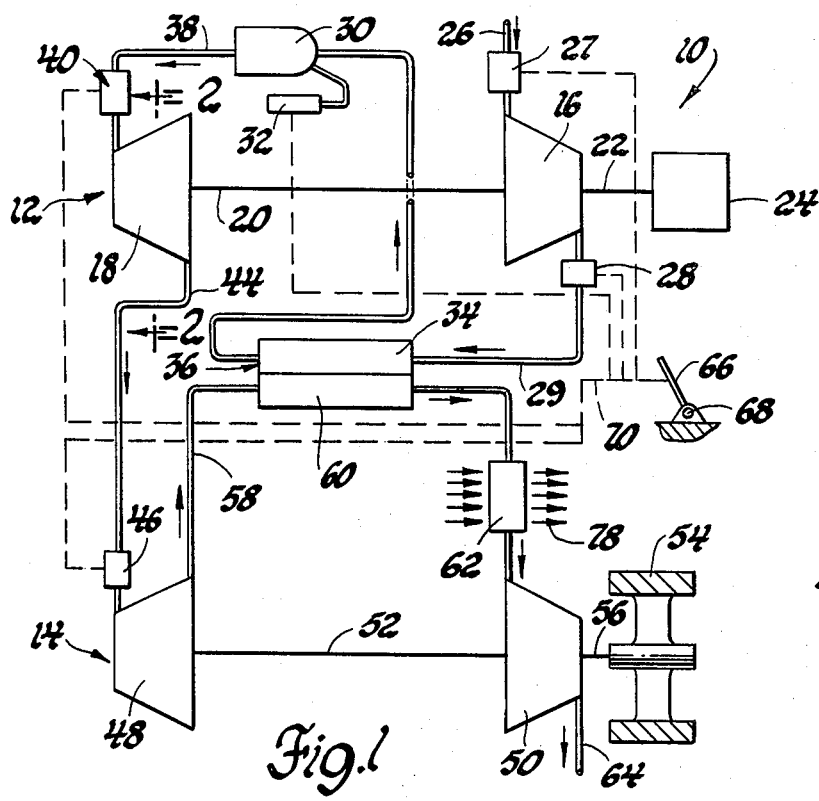
FIG. 1 is a schematic, diagrammatic view of a hybrid gas turbine engine and flywheel propulsion system according to this invention.

Referring now to FIG. 1 of the drawings, a hybrid gas turbine engine and flywheel propulsion system according to this invention and designated generally 10 includes a primary turbine-compressor rotor assembly 12 and a secondary turbine-compressor rotor assembly 14. The primary rotor assembly 12 includes a primary compressor 16 drivingly connected to a primary turbine 18 by a shaft 20. A rotating load shaft 22 is drivingly connected to shaft 20 of the primary rotor assembly and, preferably through a clutch, not shown, to a load 24 which may be a multi-ratio or continuously variable automobile transmission operative to propel a wheeled vehicle over a road surface. In preferred embodiments both the primary turbine 18 and primary compressor 16 are of radial flow design with features generally as shown and described in the aforementioned U.S. Pat. No. 3,981,140 to Lunsford et al.

Combustion air at ambient pressure and temperature is directed to primary compressor 16 through a duct 26. The primary compressor 16 has an adjustable inlet vane arrangement illustrated schematically at 27 and an adjustable diffuser passage system illustrated schematically at 28 and reference may be made to the aforementioned patent to Lunsford et al for a description of representative inlet vane and diffuser adjustment systems which can be employed. A duct 29 conveys compressed combustion air from the primary compressor 16 to a combustor 30 having a conventional fuel control 32 associated therewith operable to inject a programmed quantity of fuel into the compressed air for combustion and consequent generation of motive fluid. Intermediate the primary compressor 16 and the combustor 30, the combustion air is directed through a cold air side 34 of a conventional recuperator type heat exchanger 36.

Figure 2:
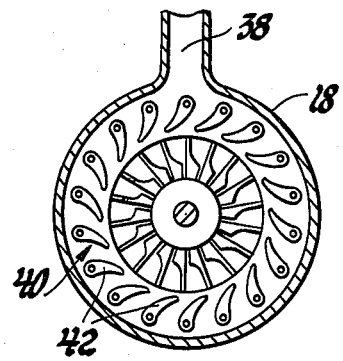
FIG. 2 is a simplified illustrative sectional view taken generally along the plane indicated by lines 2—2 in FIG. 1.

Motive fluid generated in the combustor 30 is directed by a duct 38 through an adjustable nozzle, illustrated schematically at 40, at the primary turbine 18 whereby torque is developed on the shaft 20 to drive the primary compressor 16 and the load shaft 22. Basically, the adjustable nozzle 40 includes an annular cascade of variable setting guide vanes 42, FIG. 2, rotatable to vary the spacing between the trailing edge of each vane and the adjacent vane thereby to vary the flow capacity or cascade exit angle and, thus, the power output of the primary turbine 18. The aforementioned U.S. patent to Lunsford et al includes a description of a representative adjustable turbine nozzle which can be employed.

With continued reference to FIG. 1, motive fluid is exhausted from primary turbine 18 through a duct 44 and directed by the latter through a second adjustable nozzle illustrated schematically at 46, at a secondary turbine 48 of the secondary turbine-compressor rotor assembly 14. The secondary rotor assembly 14 further includes a secondary compressor 50 drivingly connected to the secondary turbine 48 by a shaft 52 and a flywheel 54 drivingly connected to the shaft 52 by a shaft 56. In preferred embodiments, the secondary turbine 48 and the secondary compressor 50 are of radial flow design and may be as described in the aforementioned U.S. patent to Lunsford et al. A duct 58 directs exhaust from the secondary turbine 48 through a hot gas side 60 of the recuperator 36 and through an air-to-air type heat exchanger 62 to the inlet of secondary compressor 50, the secondary compressor 50 being driven by the secondary turbine and thus maintaining a subambient pressure level at the exhaust of secondary turbine 48 and then compressing the cooled exhaust to ambient pressure for dispersal into the atmosphere through a duct 64.

Operation of the adjustable nozzles 40 and 46, the adjustable guide arrangement 27, and the adjustable diffuser system 28 are coordinated with operation of the fuel control 32 in accordance with power demand as signalled by a manual controller 66. In automotive propulsion embodiments, the manual controller 66 can be an accelerator pedal pivotable about a fixed axis 68. A conventional control network, indicated schematically by broken lines 70 in FIG. 1, interconnects the manual control 66, the fuel control 32, and each of the adjustable nozzles 40 and 46 and the adjustable guide arrangement 27 and the adjustable diffuser system 28 so that movement of the manual control 66 has the immediate effect of altering, in a coordinated manner described further hereinafter, the fuel flow to the combustor 30, the airflow through primary compressor 16, and the motive fluid expansion through each of the primary and secondary turbines 18 and 48.

The hybrid propulsion system 10 according to this invention is particularly adapted for applications characterized by extended periods of steady state operation at relatively low power levels and intermittent, transient periods of operation at peak power levels considerably higher than the steady state power levels. It is particularly suited for automotive propulsion applications, for example, where a typical duty cycle includes extended periods where the vehicle is driven at relatively steady speed under normal road conditions requiring relatively low engine power output and intermittent, short periods of acceleration where significantly more power is required to accelerate the vehicle at an acceptable rate. In the hybrid propulsion system 10 according to this invention the gas turbine engine is rated for normal operation at or near the steady state power level for optimum fuel economy and, assisted by flywheel 54 during periods of peak power operation, provides increased power output for acceptable acceleration performance.

Describing more particularly the operation of the hybrid propulsion system 10, reference may be made initially to the aforementioned publication authored by Dr. N. Gasparovic for an explanation of the thermodynamic principles of operation of subambient pressure cycle gas turbine engines. Basically, by effecting motive fluid expansion to subambient pressure, a simple cycle gas turbine engine can be made to exhibit lower fuel consumption and higher specific work in a manner similar to other gas turbine engine cycles employing multiple stages of compression and intercooling. Conversely, for a given power output a subambient pressure cycle gas turbine engine will be smaller and more fuel efficient. Accordingly, the subambient pressure cycle gas turbine engine portion of the hybrid propulsion system 10, including primary and secondary rotor assemblies 12 and 14, combustor 30, recuperator 36, and heat exchanger 62, is rated for essentially optimum power output at the relatively low steady state power level required during normal road operations. During this phase or mode of operation, ambient air is compressed in the primary compressor 16, heated in the recuperator 36 and heated further in the combustor 30 by combustion of fuel supplied by control 32. The motive fluid generated by such combustion undergoes a first expansion through the primary turbine 18 whereby sufficient energy is extracted to drive the load 24 at the steady state power level and to drive the primary compressor 16. The motive fluid then undergoes a second expansion through secondary turbine 48 to subambient pressure whereby further energy is extracted sufficient to drive secondary compressor 50 and to overcome parasitic losses associated with rotation of the flywheel 54. The motive fluid thus expanded passes through the recuperator where it is cooled by the compressed air being directed to the combustor. From the recuperator 36 the motive fluid passes through the heat exchanger 62 where it is further cooled by ambient air, indicated by arrows 78 in FIG. 1, whereafter it is compressed by secondary compressor 50 to ambient pressure and exhausted through duct 64.

During the steady state operation, the fuel control 32, responsive to the power demand signalled by manual control 66, provides enough fuel to generate motive fluid in the combustor 30 having sufficient energy to drive the primary and secondary turbines 18 and 48 against resistance offered by load 24, the primary and secondary compressors 16 and 50, and incidental inefficiencies inherent in the components. The proportion of motive fluid energy extracted by respective ones of the primary and secondary turbines 18 and 48 is a function of the relative settings of the adjustable nozzles 40 and 46 which are programmed in accordance with the power level signalled by the manual control 66. Also, the adjustable guide arrangement 27 and the diffuser system 28 at the primary compressor 16 are coordinated with the settings of the adjustable nozzles 40 and 46 and the fuel control 32 such that the primary compressor will supply sufficient combustion air to support generation of motive fluid having total energy at least sufficient for the first and second expansions through the primary and secondary turbines 18 and 48. Gradual increases or decreases in steady state power level, as would occur in ordinary road driving situations, are handled solely by adjustment of the fuel delivery rate, adjustment of the positions of nozzles 40 and 46, and adjustment of the settings of guide arrangement 27 and diffuser system 28 at primary compressor 16. It will thus be appreciated that during steady state operation the hybrid propulsion system 10 is, in fact, a subambient pressure cycle gas turbine engine propulsion system with the engine rated at or near the steady state power level.

Now, when manual control 66 signals peak power demand, as for example when a vehicle operator quickly depresses the accelerator pedal in a demand for rapid vehicle acceleration, the adjustable nozzles 40 and 46 rapidly change the energy distribution between the primary and secondary turbines 18 and 48 such that virtually the total expansion of motive fluid to subambient pressure occurs across the primary turbine 18 with substantially no expansion and power extraction at secondary turbine 48 so that markedly increased power is available at load shaft 22 to effect the desired acceleration. Since the total expansion of motive fluid is now across the primary turbine 18, the secondary turbine 48 is inoperative to drive the secondary compressor 50 which, however, must continue to operate so as to maintain subambient pressure at the exhaust of the primary turbine. The energy to maintain operation of secondary compressor 50 is provided by flywheel 54 which is sized to maintain secondary compressor operation throughout the duration of a typical transient period of peak power operation. The flywheel 54 will, of course, gradually discharge during peak power operation so that if such operation extends well beyond the anticipated duration, the speed of the secondary compressor 50 will gradually diminish causing a gradual degradation of the power available at load shaft 22 so that the demanded acceleration, while not halted, will proceed at a gradually slowing rate.

At the termination of a period of peak power operation, the fuel control 32 reduces fuel flow to the combustor and the adjustable nozzles 40 and 46 again distribute the motive fluid energy between the primary and secondary turbines 18 and 48. However, because the flywheel 54 has been at least partially discharged, some additional energy is extracted at the secondary turbine 48 sufficient to accelerate the flywheel to a preselected rotational speed.

The hybrid propulsion system 10 according to this invention also includes regenerative braking capability to recapture a portion of the kinetic energy of the vehicle otherwise lost during deceleration. More particularly, in a first phase of regenerative braking release of the manual control 66 to a position corresponding to no power demand, as for example removal of the operator's foot from the accelerator pedal, produces response at the fuel control 32 whereby fuel flow is minimized or completely terminated. Substantially simultaneously, the guide arrangement 27 and the diffuser system 28 at the primary compressor 16 are conditioned to effect controlled airflow through the compressor, the latter being driven by the inertia of the load through load shaft 22, while adjustable nozzle 40 is conditioned to allow virtually unrestricted passage of the compressed air through the primary turbine. The compressed air then passes through the adjustable nozzle 46 which is conditioned to effect expansion of the compressed air through secondary turbine 48 for extraction of enough energy to accelerate the secondary rotor assembly 14, including the flywheel 54, up to a predetermined maximum speed. The expansion through turbine 48 may be assisted by secondary compressor 50 which maintains the exhaust of secondary turbine 48 at subambient pressure. The power to drive secondary compressor 50, of course, is extracted from the compressed air expanding through secondary turbine 48 and, since the power being extracted at secondary turbine 48 exceeds that necessary to drive secondary compressor 50, the secondary rotor assembly 14 is accelerated to maximum speed. During the regenerative braking mode, the expanded air from secondary turbine 48 may be compressed back to ambient pressure by the secondary compressor for exhaust to the atmosphere, or may bypass the secondary compressor and discharge directly to atmosphere.

During this first phase of regenerative braking, vehicle kinetic energy is dissipated at the primary compressor and also transferred from the vehicle to the secondary rotor assembly 14 as the latter is accelerated to maximum rotational speed. If surplus vehicle or load kinetic energy exists at completion of the first phase of regenerative braking, then a second phase is initiated consisting, at least in part, of acceleration of the primary rotor assembly 12 up to a maximum rotational speed. This can be most simply effected through mechanical coupling of the load 24 to the load shaft 22 and to the primary rotor assembly 12 as by means of a continuously variable gear ratio transmission. Accordingly, vehicle kinetic energy is transferred directly to the accelerating primary rotor assembly and the vehicle continues to decelerate or slow down.

As an adjunct to the second phase of regenerative braking, a vacuum system, including pump and associated equipment as described more fully hereinafter in connection with a modified embodiment of the invention illustrated in FIG. 3, can be incorporated. In the vacuum system a pump is mechanically coupled to the load to be decelerated so that the load drives the pump. The pump, in turn, is connected to enclosures surrounding the primary and secondary rotor assemblies 12 and 14 and functions to evacuate the enclosures to the maximum degree possible. Evacuation accomplishes two goals. First, some vehicle kinetic energy is converted to drive the vacuum pump as the latter brings the enclosures to maximum evacuation, thus contributing to vehicle braking. Second, evacuation minimizes parasitic losses associated with maximum speed rotation of the primary and secondary rotors so that the rotors maintain their rotational speeds, poised for the next succeeding acceleration or maximum power demand cycle. After the second phase of regenerative braking is completed, further vehicle or load kinetic energy, if it still exists, must be absorbed in conventional manner by the vehicle's service brakes.

Figure 3:
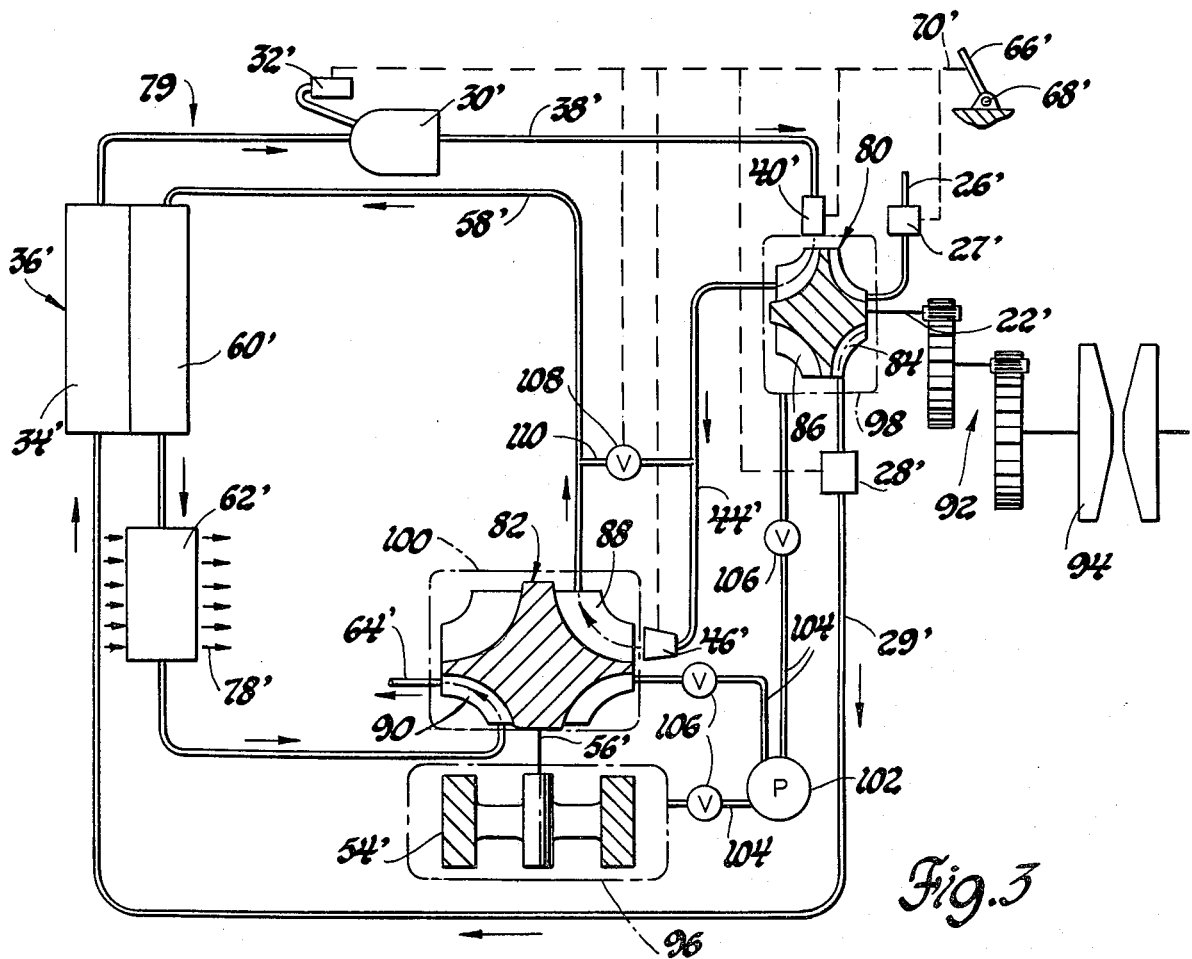
FIG. 3 is similar to FIG. 1 but showing a modified hybrid gas turbine engine and flywheel propulsion system according to this invention.

Referring now to FIG. 3 where components identical to the corresponding components described for the hybrid propulsion system 10 illustrated in FIG. 1 are identified with primed reference characters, a modified hybrid propulsion system 79 is schematically illustated and includes a primary rotor assembly 80 and a secondary rotor assembly 82. The primary rotor assembly 80 is in the form of a monorotor, one side of which includes a plurality of radial compressor vanes defining a primary compressor 84 and a plurality of radial turbine vanes defining the primary turbine 86. Similarly, the secondary rotor assembly 82 may also be in the form of a monorotor having a plurality of radial turbine vanes defining a secondary turbine 88 and a plurality of radial compressor vanes defining a secondary compressor 90. Load shaft 22' is rigidly connected to the primary rotor assembly 80 and drives a reduction gear train 92 by means of which an input side 94 of a continuously and infinitely variable belt type transmission unit is driven. Similarly, the flywheel 54' is rigidly connected to shaft 56', which, in turn, is rigidly connected to the secondary rotor assembly 82 for rotation as a unit therewith. The flywheel 54' is disposed in an enclosure schematically illustrated at 96 while the primary and secondary rotor assemblies are similarly disposed in enclosures schematically illustrated at 98 and 100 respectively. A vacuum pump 102, preferably selectively coupled to the load shaft 22', is connected through a plurality of ducts 104 and valves 106 to the enclosures 96, 98 and 100. Finally, a valve or waste gate 108 is disposed in a conduit 110 interconnecting the ducts 44' and 58'. Opening of the waste gate 108 is coordinated with movement of the manual control 66' as indicated by incorporation of the waste gate in the control network 70' and may, as described hereinafter, eliminate the necessity for adjustment of nozzle 46'.

The modified hybrid propulsion system 79 operates essentially as described with respect to hybrid propulsion system 10. In particular, during steady state power level operation combustion air at ambient pressure and temperature is directed to the primary compressor 84 by duct 26'. Again, associated with the primary compressor is an adjustable inlet guide arrangement 27' and an adjustable diffuser passage system 28' which function as described hereinbefore to control airflow through the primary compressor. From the primary compressor, compressed air is directed through the recuperator 36' where it is heated prior to combustion in combustor 30'. Motive fluid generated in combustor 30' is delivered to the primary turbine 86 by duct 38' through adjustable nozzle 40'. The motive fluid exits primary turbine 86 through duct 44' and is directed through adjustable nozzle 46' at secondary turbine 88. The motive fluid expands through the secondary turbine and exits through duct 58' to pass in reverse direction through the recuperator 36' and then through the heat exchanger 62' in which further cooling takes place. The cooled motive fluid is then compressed to ambient pressure by the secondary compressor 90 and expelled to the atmosphere through duct 64'. The flywheel 54' rotates as a unit with the secondary rotor assembly 82 within the envelope 96.

The adjustable nozzles 40' and 46' and the guide arrangement 27' and diffuser system 28' operate in coordinated fashion with fuel control 32' and manual control 66' to proportion power extraction between the primary and secondary rotor assemblies 80 and 82 essentially as described hereinbefore. The waste gate 108 inserted between ducts 44' and 58', provides improved motive fluid flow through the engine during periods of peak power level operation. In particular, when peak power demand is signalled at manual control 66', the adjustable nozzles 40' and 46' effect total expansion of motive fluid across the primary turbine 86 to provide increased power at load shaft 22' as described hereinbefore. Simultaneously, the waste gate 108 opens to provide direct communication between ducts 44' and 58', thereby completely avoiding the secondary turbine 88. Of course, when the secondary turbine 88 is thus effectively eliminated from the motive fluid circuit, energy to drive the secondary rotor assembly 82 is derived from the flywheel 54'. When return to steady state power operation is signalled, the waste gate 108 closes and normal motive fluid circulation through secondary turbine 88 commences.

It will be apparent that the waste gate 108 can eliminate the need for adjustability at the nozzle 46' at secondary turbine 88. For example, nozzle 46' can be made non-adjustable and operative to effect sufficient energy extraction from the motive fluid such that under normal steady state conditions sufficient power is developed to drive the secondary compressor 90 and maintain the flywheel 54' at a desired rotational speed. Since the waste gate 108 completely bypasses the nozzle 46', there is no need for any adjustment nozzle when peak power operation is desired and only nozzle 40' at the primary turbine need be adjusted. When steady state operation resumes, the energy extracted at the secondary turbine is, by design, substantially constant and sufficient to recharge the flywheel.

Regenerative braking in modified hybrid propulsion system 79 is effected in two phases as described hereinbefore with respect to hybrid system 10. In modified system 79 the vacuum arrangement alluded to hereinbefore includes the enclosures 96, 98 and 100 as well as vacuum pump 102 and control valves 106 in vacuum ducts 104 extending between the pump and the enclosures. As described, in the second phase of regenerative braking the pump 102, driven by the load shaft 22', evacuates the enclosures 96, 98 and 100 through the ducts 104. In this manner parasitic losses associated with rotation of the flyweel 54' and with rotation of the primary and secondary rotor assemblies 80 and 82 is minimized while energy is absorbed at the vacuum pump.

The embodiments of the invention in which an exclusive property or privilege is claimed are defined as follows:

1. In combination with a subambient pressure cycle gas turbine engine having a peak power output level and a steady state power output level substantially less than said peak power output level and including a load shaft, a combustor, a primary compressor, a primary turbine drivingly connected to said primary compressor and to said load shaft, a secondary compressor, a secondary turbine drivingly connected to said secondary compressor, and duct means serially connecting said pimary compressor and said combustor and said primary turbine and said secodary turbine and said secondary compressor so that motive fluid generated in said combustor from combustion of fuel in air pressurized by said primary compressor may expand through respective ones of said primary and said secondary turbines to a subambient pressure level maintained by said secondary compressor and thereafter be compressed by the latter to ambient pressure, the combination comprising, a flywheel drivingly connected to said secondary compressor, and motive fluid expansion control means at said primary turbine and at said secondary turbine operative during engine operation at said steady state power output level to serially effect partial expansion of said motive fluid at said primary turbine whereby said steady state power output level is achieved at said load shaft and partial expansion at said secondary turbine whereby sufficient energy is extracted and directed to said secondary compressor to maintain said subambient pressure level and further operative during engine operation at said peak power output level to effect a substantially total expansion of said motive fluid at said primary turbine so that said peak power output level is achieved at said load shaft, said flywheel being operative to drive said secondary compressor during engine operation at said peak power output level thereby to maintain said subambient pressure level for said total motive fluid expansion.

2. The combination recited in claim 1 wherein said motive fluid expansion control means includes variable geometry means at said primary turbine and at said secondary turbine.

3. The combination recited in claim 1 wherein each of said primary and said secondry turbines is a radial flow turbine and each of said primary and said secondary compressors is a radial flow compressor.

4. A hybrid gas turbine engine and flywheel propulsion system comprising; a subambient pressure cycle gas turbine engine having a peak power output level and a steady state power output level substantially less than said peak power output level and including a load shaft, a combustor, a first rotatable monorotor defining a primary radial flow compressor and a primary radial flow turbine, means drivingly connecting said first monorotor to said load shaft, a second rotatable monorotor defining a secondary radial flow turbine and a secondary radial flow compressor, and duct means serially connecting said primary compressor and said combustor and said primary turbine and said secondary turbine and said secondary compressor so that motive fluid generated in said combustor from combustion of fuel in air pressurized by said primary compressor may expand through respective ones of said primary and said secondary turbines to a subambient pressure level maintained by said secondary compressor and thereafter be compressed by the latter to ambient pressure; a recuperator operative to effect heat exchange between said motive fluid after expansion through said secondary turbine and said pressurized air prior to combustion; a heat exchanger operative to effect heat exchange between ambient air and said motive fluid after heat exchange in said recuperator; a flywheel rigidly connected to said second monorotor; and motive fluid expansion control means at said primary turbine and at said secondary turbine operative during engine operation at said steady state power output level to effect partial expansion of said motive fluid at said primary turbine whereby said steady state power output level is achieved at said load shaft and partial expansion at said seconday turbine whereby sufficient energy is extracted and directed to said secondary compressor to maintain said subambient pressure level and further operative during engine operation at said peak power output level to effect a substantially total expansion of said motive fluid at said primary turbine so that said peak power output level is achieved at said load shaft, said flywheel being operative to drive said secondary compressor during engine operation at said peak power output level thereby to maintain said subambient pressure level for said total motive fluid expansion.

5. A hybrid gas turbine engine and flywheel propulsion system comprising; a subambient pressure cycle gas turbine engine having a peak power output level and a steady state power output level substantially less than said peak power output level and including a combustor, a load shaft connected to a load capable of back driving said load shaft through load inertia, a first monorotor defining a primary radial flow compressor and a primary radial flow turbine and supported on said engine for rotation at a first monorotor normal speed corresponding to engine operation at said steady state power output level and a first monorotor higher speed corresponding to engine operation at said peak power output level, means drivingly connecting said first monorotor to said load shaft, a second monorotor rotatably supported on said engine and defining a secondary radial flow turbine and a secondary radial flow compressor, and duct means serially connecting said primary compressor and said combustor and said primary turbine and said secondary turbine and said secondary compressor so that motive fluid generated in said combustor from combustion of fuel in air pressurized by said primary compressor may expand through respective ones of said primary and said secondary turbines to a subambient pressure level maintained by said secondary compressor and thereafter be compressed by the latter to ambient pressure; a recuperator operative to effect heat exchange between said motive fluid after expansion through said secondary turbine and said pressurized air prior to combustion; a heat exchanger operative to effect heat exchange between ambient air and said motive fluid after heat exchange in said recuperator; a flywheel rigidly connected to said second monorotor and rotatable therewith; first variable geometry motive fluid expansion control means at each of said primary turbine and said secondary turbine operative during engine operation at said steady state power output level to effect partial expansion of said motive fluid at said primary turbine whereby said steady state power output level is achieved at said load shaft and partial expansion at said secondary turbine whereby energy is extracted and directed to said secondary compressor to maintain said subambient pressure level and further operative during engine operation at said peak power output level to effect substantially total expansion of said motive fluid at said primary turbine so that said peak power output level is achieved at said load shaft, said flywheel being operative to drive said secondary compressor during engine operation at said peak power output level thereby to maintain said subambient pressure level for said total motive fluid expansion; and second control means at said combustor and at each of said first and said second monorotors operative when substantially no engine power is demanded and said load shaft back drives said first monorotor to reduce the level of combustion in said combustor and to expand air compressed in said primary compressor through said secondary turbine to increase the speed of said second monorotor and said flywheel to a maximum second monorotor speed so that load kinetic energy is transferred to and stored in said second monorotor and then operative to mechanically accelerate said first monorotor to said first monorotor higher speed to thereby transfer to and store additional load kinetic energy in said first monorotor.

* * * * *